United States Patent
Bui et al.

(10) Patent No.: US 10,335,885 B2
(45) Date of Patent: Jul. 2, 2019

(54) STUD WELDING GUN SET UP TEACHING TOOL

(71) Applicant: Toyota Motor Engineering & Manufacturing North America, Inc., Erlanger, KY (US)

(72) Inventors: Dung Tien Bui, Waterloo (CA); Aditya Nitin Dhora, Brampton (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 898 days.

(21) Appl. No.: 14/175,842

(22) Filed: Feb. 7, 2014

(65) Prior Publication Data
US 2015/0224592 A1 Aug. 13, 2015

(51) Int. Cl.
*B23K 9/20* (2006.01)
(52) U.S. Cl.
CPC .............. *B23K 9/205* (2013.01); *Y10S 901/03* (2013.01); *Y10S 901/42* (2013.01)
(58) Field of Classification Search
CPC ...... B23K 9/205; Y10S 901/42; Y10S 901/03
USPC ..................................................... 219/98, 99
See application file for complete search history.

(56) References Cited

U.S. PATENT DOCUMENTS

| | | | | | |
|---|---|---|---|---|---|
| 2,462,882 | A | * | 3/1949 | Martin ................... | B23K 9/205 219/98 |
| 2,467,723 | A | * | 4/1949 | Barlow ................. | B23K 9/205 219/98 |
| 2,473,871 | A | * | 6/1949 | Edels ....................... | B23K 9/08 219/123 |
| 3,021,418 | A | * | 2/1962 | Van Den Blink ...... | B23K 9/201 219/99 |
| 3,352,996 | A | * | 11/1967 | Neumeier .............. | B23K 9/201 219/98 |
| 3,758,743 | A | * | 9/1973 | Lake ..................... | B23K 9/206 219/98 |
| 3,940,587 | A | * | 2/1976 | Oehry .................... | B23K 9/202 219/98 |
| 4,002,876 | A | * | 1/1977 | Wieland, Jr. ........... | B23K 9/202 219/98 |

(Continued)

OTHER PUBLICATIONS

Imagine Ind Inc, "Welder's Guide to Arc Stud Welding", Mar. 1993 Revision 1, Wooddale, IL in 14 pages.

*Primary Examiner* — Ibrahime A Abraham
*Assistant Examiner* — Biniam B Asmelash
(74) *Attorney, Agent, or Firm* — Christopher G. Darrow; Darrow Mustafa PC

(57) ABSTRACT

A method and apparatus for teaching a programmed controlled robot at least one of two set up position coordinates by use of a tool having a first surface aligned with the end of a stud welding gun collet when the tool is mounted in the collet, a second surface on the tool spaced from the first surface by a predetermined set up distance. A probe carried by the stud welding engagable with the second surface on the tool to establish a predetermined set up distance. A third surface on the tool spaced from the first surface and engagable with a work piece to establish a minimum stud-welding gun set up dimension. The coordinates of the stud-welding gun when the third surface is engaged with the work piece are transmitted to a robot control program to establish the predetermined stud weld gun travel distance dimension.

9 Claims, 4 Drawing Sheets

(56) References Cited

U.S. PATENT DOCUMENTS

| | | | | |
|---|---|---|---|---|
| 4,368,654 A * | 1/1983 | Kober | ............. | H02G 1/1224 |
| | | | | 30/90.1 |
| 4,562,329 A * | 12/1985 | Minton | ............. | B23B 31/202 |
| | | | | 219/98 |
| 4,567,344 A * | 1/1986 | Michalski, Jr. | ......... | B23K 9/201 |
| | | | | 219/98 |
| 4,788,407 A * | 11/1988 | Flater | ............. | B23K 11/3018 |
| | | | | 137/614.11 |
| 5,001,322 A * | 3/1991 | Alessandri, Jr. | ......... | B23K 9/22 |
| | | | | 219/95 |
| 5,384,445 A * | 1/1995 | Nakagami | ............. | B23K 9/20 |
| | | | | 219/98 |
| 5,452,839 A * | 9/1995 | Kapusnik | ............. | B23K 9/205 |
| | | | | 219/227 |
| 5,471,029 A * | 11/1995 | Simmons | ............. | B23K 11/3018 |
| | | | | 219/120 |
| 6,239,401 B1 * | 5/2001 | McCardle | ............. | B23K 9/206 |
| | | | | 219/98 |
| 7,223,934 B2 * | 5/2007 | Gobel | ............. | B23K 9/202 |
| | | | | 219/98 |
| 7,521,646 B2 * | 4/2009 | Schlafhauser | ......... | B23K 9/206 |
| | | | | 219/98 |
| 2008/0110867 A1 * | 5/2008 | Leininger | ............. | B23K 9/202 |
| | | | | 219/98 |
| 2009/0026176 A1 * | 1/2009 | Hobson | ............. | B23K 9/202 |
| | | | | 219/98 |

* cited by examiner

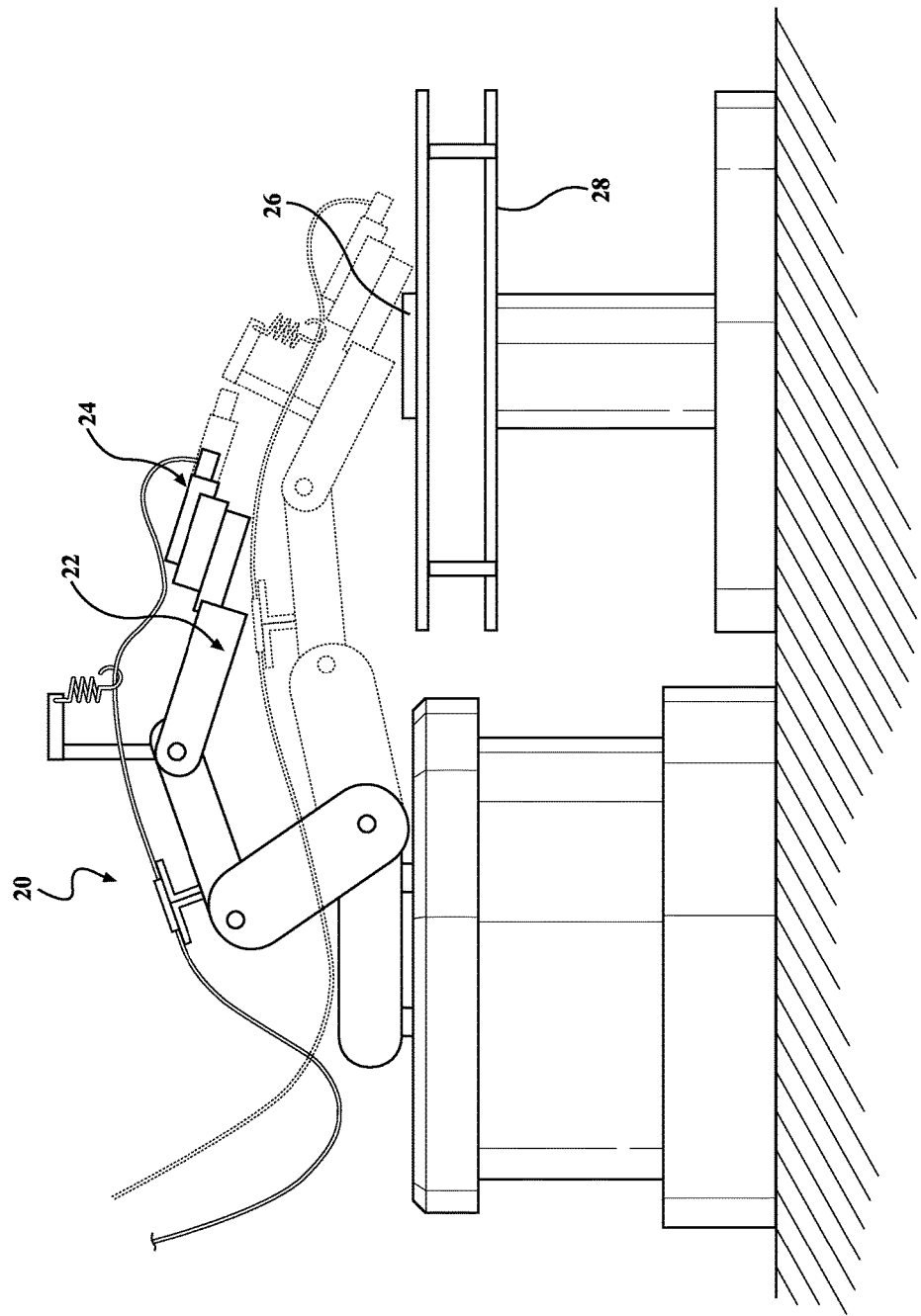

STUD WELDING GUN SET UP TEACHING TOOL

BACKGROUND

The present disclosure relates, in general, to a stud welding apparatus and, particularly, to stud welding gun dimensional set up teaching tools.

Stud welding guns are widely used in manufacturing operations to weld metal studs to the surface of metal work pieces for the subsequent attachment of other work pieces via the stud.

Typically, a stud welding gun includes a collet which holds the tip end of a stud in a position for welding to a work piece surface when the weld gun is advanced into a welding position.

A probe is attached to the weld gun and has an end which is adjustably positioned beyond the end of the collet. The probe stabilizes the workpiece during welding and prevents contact between the collet and the workpiece if a stud is not advanced into the collet at the start of the welding operation.

In addition, when the weld head moves forward, the stud makes contact with the work piece which pushes the stud and collet backward away from the work piece until the probe makes contact with the work piece. This establishes the maximum penetration distance after the weld head retracts. The weld head is retracted a few millimeters before an arc is established between the stud and the work piece. The stud is subsequently advanced into the molten metal at the location of the arc on the work piece.

Stud welding apparatus advantageously lend themselves to automatic machine applications, such as programmed robot applications, so that the studs can be precisely positioned in the proper location on a workpiece.

However, it is necessary to manually adjust the position of the probe to the proper empty collet safety distance between the end of the collet and the end of the probe as well as program or teach the robot the stud height, depending upon the height of the stud being welded, when the weld gun begins its advance to the weld position. Previously, these two teaching steps were performed manually using an operator's skill, experience, and a measurement scale. However, the minute distances, typically only a few millimeters, are difficult to accurately gauge by the eye.

Thus, it would be desirable to provide a teaching tool that could be used to automatically teach or program a robot with the proper set up dimensions for stud welding operations which eliminates manual operator intervention.

SUMMARY

A tool is adapted to be mounted in collet of a stud welding gun to set at least one of a predetermined set up distance between an end of a collet and an end of a probe attached to the stud welding gun, and a predetermined minimum weld position of the end of the collet with respect to a surface of a work piece includes a body having a first end portion adapted to be coupled to a collet of a stud welding gun. The body includes a first surface adapted to engage with the end of a collet and a second surface spaced from the first surface by a predetermined probe set up distance.

The body has a third surface spaced from the first surface by a minimum weld stud set up distance. The third surface is defined by a stem extending from the body, with an end of the stem defining the third surface.

A biasing spring may be mounted in the body and engaged with the stem to normally bias the end of the stem outward relative to the body.

A method for teaching a control program of a robot having an end effector under program control to move the end effector through a path of movement, a stud welding gun mounted on the robot end effector where, at a weld position of the stud welding gun, a minimum weld stud distance is programmable into a robot controlled program including forming a tool with a first end portion and a first surface spaced from the first end portion, forming one of a second surface on the tool spaced from the first surface by a predetermined probe set up distance engaging an end of a probe attached to a stud weld gun carried by the robot end effector with the second surface on the tool, and fixing the end of the probe at the predetermined probe set up distance or forming a third surface on the tool spaced from the first surface by a predetermined weld stud distance, mounting the first end portion of the tool in a collet of as stud weld gun to engage the first surface with the end of the collet, engaging the third surface with the work piece, and establishing the coordinates of the weld gun when the third surface engages the weld surface of a work piece.

BRIEF DESCRIPTION OF THE DRAWING

The various features, advantages and other uses of the present stud welding gun set up teaching tool will become more apparent by referring to the following detailed description and drawing in which:

FIG. 1 is a side elevational view of a programmable robot carrying a stud-welding gun for implementing stud-welding operations on a work piece;

DETAILED DESCRIPTION

Figure 3:
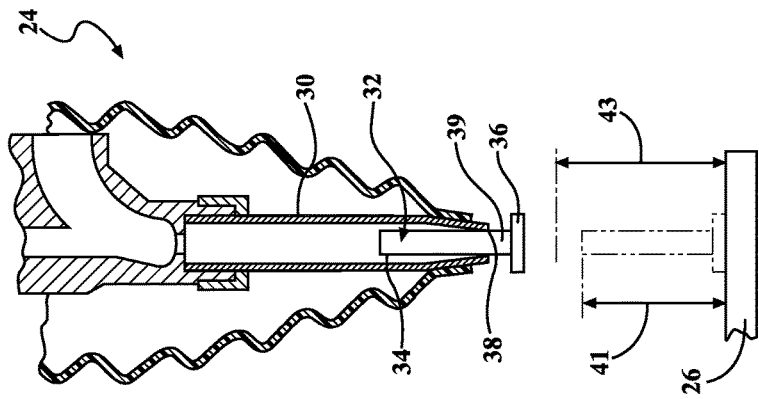
FIG. 3 is a pictorial representation of a stud mounted in a collet of a stud-welding gun and showing the two set up dimensions and maximum stud-welding gun advance dimension with respect to a work piece.

Referring now to FIGS. 1-7, there is depicted a teaching tool 10 for use in the teaching the dimensional set up of an automatic machine, such as a programmed robot 20. The programmed robot 20 may take any suitable robot form and, for purposes of this description, the robot 20 will be described only with respect to its end effector 22, which carries a stud-welding gun 24.

The robot 20, when executing its end effector position control program, moves the stud-welding gun 24 between one or more successive positions relative to a work piece 26 in FIGS. 1, 2, 3 and 7. The work piece 26 is disposed on a worktable 28 and held in position by suitable positioning means, such as clamps, magnetic attraction, etc., not shown.

As shown in FIGS. 1-4 and 7, the stud-welding gun 22 includes a collet 30 at a tip end of a stud advancing, holding and electrifying apparatus. A stud 32 is shown in FIG. 3 in its pre-welding position. The stud 32 includes a shaft 34 and a flat, perpendicularly arranged tip 36. In the pre-welding position shown in FIG. 3, the tip 36 and the attached end portion of the shaft 34 project linearly outward from an open end 38 of the collet 30.

In a stud-welding operation, the stud-welding gun 22 advances from the pre-welding position shown in FIG. 3 to a welding position where the tip 36 of the stud 32 is engaged with the outer surface of the work piece 26. The maximum advance distance is approximately.

By way of example, a dimension 43 is selected by adding the stud length 41 of approximately 30 mm, for example, plus an additional 10 mm for a maximum dimension 43 of 40 mm.

Figure 2:
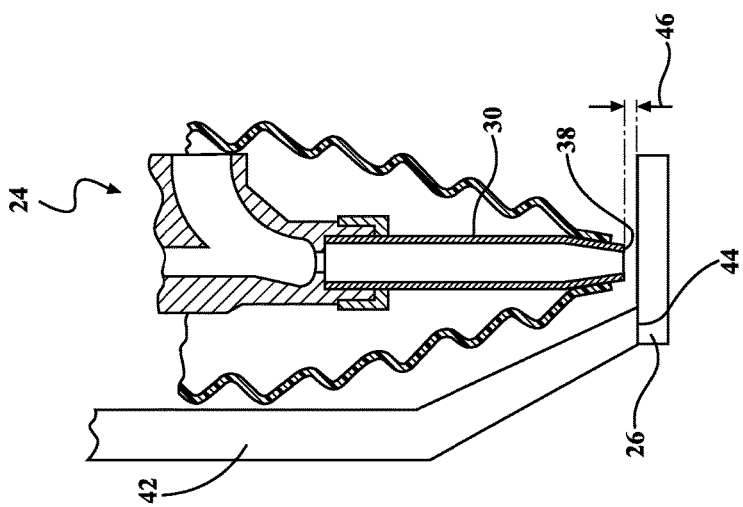
FIG. 2 is a pictorial representation showing the required set up dimension between the end of a stud mounted in the collet of a stud-welding gun and a work piece surface.
Figure 4:
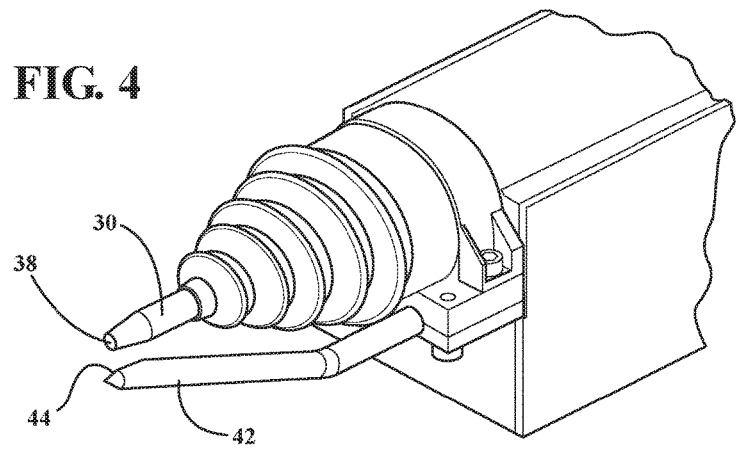
FIG. 4 is a perspective view showing the adjustable mounting of the probe relative to the collet of the stud-welding gun.
Figure 5:
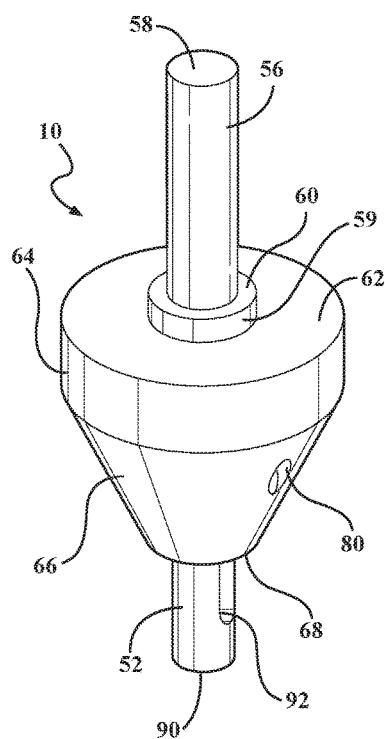
FIG. 5 is a perspective view of a robot set up teaching tool.

FIGS. 2 and 4 depict a probe 42 which is mounted on the stud-welding gun 22 and has an end 44. The end 44 of the probe 42 is positioned at a predetermined empty collet safety distance from the end 38 of the collet 30 as denoted by dimension 46. For example, the empty collet safety distance can be 2 mm.

It is necessary to teach or program the robot 20 with the dimensions 43 and 46. The teaching tool 10 shown in FIGS. 5, 6, and 7 automatically establishes either one or both of the two dimensions 43 and 46 when mounted in the end of the collet 30.

The teaching tool 10 includes a multi-piece assembly of a main body 50, a shaft-like stem 52 and an attachment pin 54. The main body 50, which is formed as a one-piece, integral member of a suitable dimensionally accurate material, such as metal, stainless steel, etc., includes a shaft 56 extending from one end 58 to a shoulder 59 defining a first surface 60. The shoulder 59 has a larger outer diameter than the diameter of the shaft 56. The shoulder 59 transitions into a larger second surface 62. By way of example only, the shaft 56, the shoulder 60, and the second surface 62 have circular cross sections. It will be understood that other cross sectional shapes may also be employed for these elements of the main body 50.

The second surface 62 forms one end of an cylindrical ring 64 which transitions into an inverted frusto-conical portion 66 terminating in an end 68. A bore 70 extends from the end 68 of the main body 50 at a first diameter 72 and transitions into a smaller diameter bore 74 terminating in an end adjacent the first end 58 of the shaft 56. A cross bore 80 is formed in the frusto-conical surface 66 of the main body 50 and sized to removably receive the attachment pin 54.

The stem 52 has a generally cylindrical shape extending from a first end 82 through a cylindrical shaft portion 84 of a first diameter to a shoulder 86. The shoulder 86 transitions into a second diameter portion 88 of the stem 52 which extends to a second end 90. A slot like bore 92 is formed in the second diameter portion 88 of the stem 52.

A biasing means 94, shown by way of example as being in the form of a coil spring, is mounted in a bore 96 extending from the first end 82 of the stem 52 to an opposite closed end 98.

In assembling the teaching tool 10, the biasing means or coil spring 94 is inserted into the bore 96 of the stem 52 before the stem 52 is urged into and through the aligned bores 72 and 74 in the body 50. The shoulder 86 on the stem 52 is engageable with the a light shoulder 100 formed in the bore 70 and the body 50 at the transition of the first diameter portion 72 to the second diameter portion 74 of the bore 70 and acts as a travel limit in one direction for the stem 52.

The attachment pin 54 is then inserted through one end of the bore 80 and through the bore 92 in the stem 52 to attach the stem 52 to the body 50, with the second end 90 of the stem 52 biased outward to a normal position shown in FIGS. 2 and 4 by the biasing means 94.

The teaching tool 10 is inserted in a removable friction fit through the open end 38 of the collet 30 until the first surface 60 on the main body 50 engages the end 38 of the collet 30.

The probe 42 may then be adjusted, as shown in FIG. 4, until the end 44 of the probe 42 engages or rests on the second surface 62 of the body 50. As shown by dimensional reference number 110, in FIG. 7, the distance between the shoulder 60 and the second surface 62 on the main body 50 is set to the predetermined empty collet safety distance 46. This insures that the tip end 44 of the probe 42 is accurately positioned at the prescribed empty collet safety distance 46 from the end 38 of the collet 30 as shown in FIG. 2.

Figure 7:
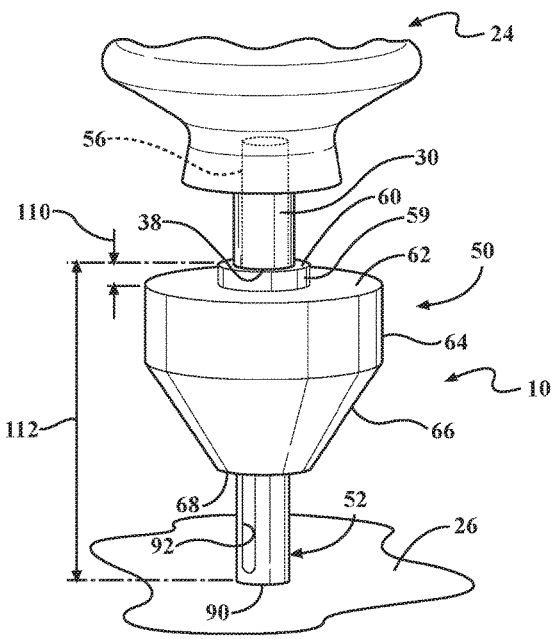
FIG. 7 is a perspective view showing the mounting of the teaching tool on the collet of a stud-welding gun.
Figure 6:
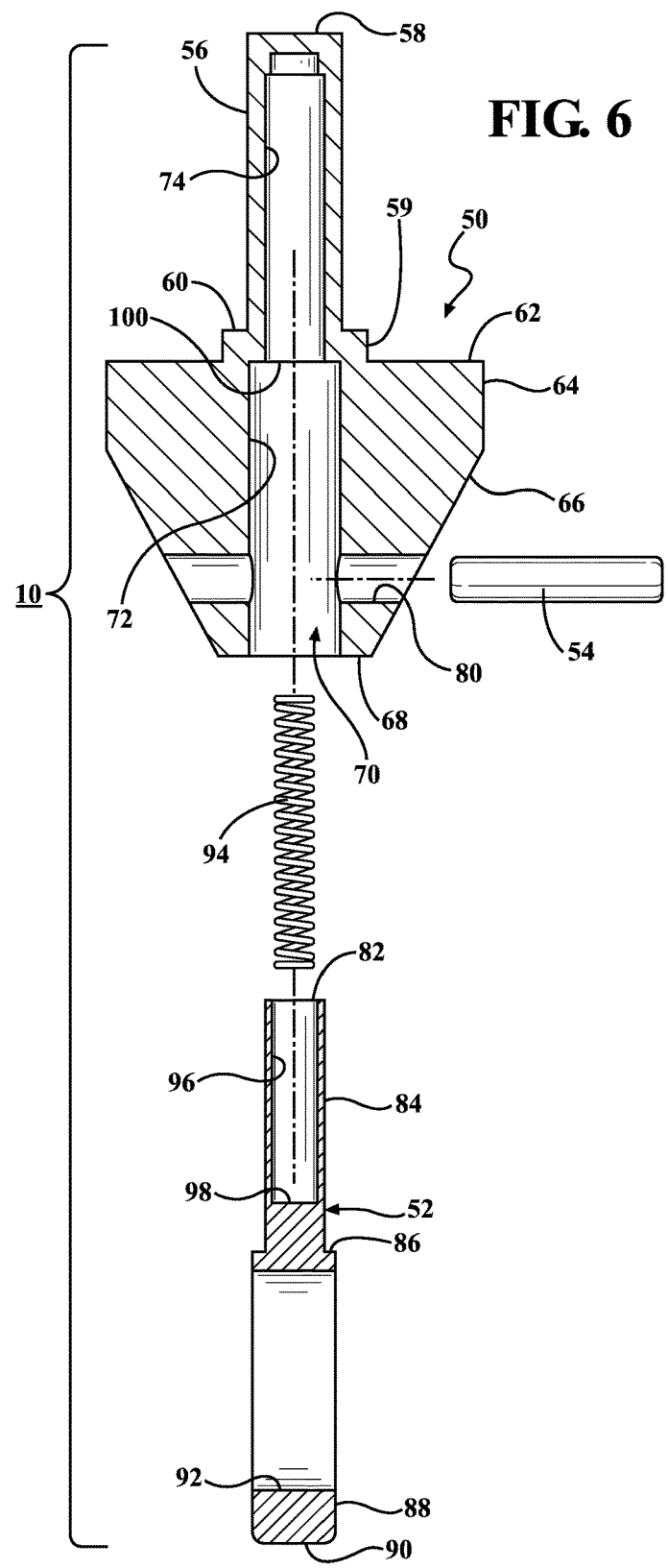
FIG. 6 is an exploded longitudinal cross-sectional view of the teaching tool shown in FIG. 5.

At the same time, the distance shown by dimensional reference number 112 in FIG. 7 is equal to the predetermined stud length plus a correct height position between the end 38 of the collet 30 of the stud welding gun 24 and the surface of the work piece 26 as shown by the dimension 43 in FIG. 3.

With the teaching tool 10 mounted in the end of the collet 30, as described above, the probe 42 on the stud welding gun 22 can be manually adjusted so that tip 44 of the probe 42 engages the second surface 62 of the teaching tool 10 to establish the predetermined empty collet safety distance 46. The end effector 22 of the robot 22 can then be advanced toward the work piece 26 until the second end 90 of the teaching tool 10 engages the surface of the work piece 26. This establishes the minimum stud dimensional clearance shown by dimension 43. The coordinates of this position of the robot end effector 22 are then stored in the memory of the robot 20 to establish the advance position of the stud welding gun 24 during each stud welding operation.

What is claimed is:

1. A teaching tool for providing a dimensional set up of a stud-welding gun, the teaching tool comprising:
    a main body defining a first surface and a second surface;
    a shaft configured to be received within a collet of the stud-welding gun, the shaft being integrally formed as a one-piece component with the main body and extending a distance from the first surface of the main body;
    a first bore defined in a center of the main body and extending from a first end of the main body, opposite the shaft, and continuing through to an end of the shaft;
    a movable stem having a cylindrical shape and received in the first bore defined in the main body, the movable stem defining a second bore opposite from an end of the moveable stem defining a third surface;
    a biasing spring disposed in the first bore of the main body and in the second bore of the movable stem, the biasing spring being engaged with the movable stem to normally bias the movable stem in a direction opposite from the shaft; and
    an attachment pin to couple the movable stem to the main body,
    wherein a first distance between the first surface and the second surface defines a distance representative of a predetermined probe set up dimension, and a second distance between the first surface and the third surface defines a distance representative of a minimum weld set up dimension.

2. The teaching tool of claim 1, wherein the main body comprises a shoulder portion that defines the first surface.

3. The teaching tool according to claim 2, wherein the first surface of the shoulder portion contacts an end of the collet of the stud-welding gun in an assembled state.

4. The teaching tool of claim 2, wherein the shoulder portion transitions into the second surface.

5. The teaching tool of claim 1, wherein the movable stem defines a slot-like bore and the main body defines a cross bore, the slot-like bore and the cross bore cooperating to accept the attachment pin.

6. The teaching tool of claim 1, wherein the main body comprises cylindrical ring shape portion that transitions into an inverted frusto-conical portion, terminating in an end.

7. A teaching tool for providing a dimensional set up of a stud-welding gun, the teaching tool comprising:
   a main body comprising:
      a shoulder portion defining a first surface;
      a cylindrical ring portion defining a second surface and transitioning into an inverted frusto-conical portion terminating at an end of the main body;
   a shaft configured to be received within a collet of the stud-welding gun, the shaft being integrally formed as a one-piece component with the main body and extending a distance from the first surface of the shoulder portion to a shaft end; and
   a first bore defined in the end of the main body and extending through to the shaft end;
   a movable stem received in the first bore defined in the end of the main body, the movable stem defining a second bore configured to retain a biasing means to bias the movable stem in a direction opposite from the shaft, an end of the movable stem defining a third surface; and
   an attachment pin to couple the movable stem to the main body,
   wherein a first distance between the first surface and the second surface defines a distance representative of a predetermined probe set up dimension, and a second distance between the first surface and the third surface defines a distance representative of a minimum weld set up dimension.

8. The teaching tool of claim 7, wherein the movable stem defines a slot-like bore and the main body defines a cross bore, the slot-like bore and the cross bore cooperating to accept the attachment pin.

9. The teaching tool of claim 8, wherein the cross bore is defined in the inverted frusto-conical portion.

* * * * *